(12) United States Patent
Wang et al.

(10) Patent No.: US 10,928,952 B2
(45) Date of Patent: Feb. 23, 2021

(54) TOUCH DISPLAY PANEL AND TOUCH DISPLAY DEVICE

(71) Applicant: Shanghai Tianma AM-OLED Co., Ltd., Shanghai (CN)

(72) Inventors: Qingxia Wang, Shanghai (CN); Min Chen, Shanghai (CN); Kaihong Huang, Shanghai (CN)

(73) Assignee: SHANGHAI TIANMA AM-OLED CO., LTD., Shanghai (CN)

( * ) Notice: Subject to any disclaimer, the term of this patent is extended or adjusted under 35 U.S.C. 154(b) by 1 day.

(21) Appl. No.: 16/460,353

(22) Filed: Jul. 2, 2019

(65) Prior Publication Data

US 2020/0192543 A1    Jun. 18, 2020

(30) Foreign Application Priority Data

Dec. 17, 2018    (CN) .......................... 201811542264.4

(51) Int. Cl.
  *G06F 3/041*    (2006.01)
  *G06F 3/047*    (2006.01)
  *G06F 3/044*    (2006.01)

(52) U.S. Cl.
  CPC .......... *G06F 3/04164* (2019.05); *G06F 3/047* (2013.01); *G06F 3/0412* (2013.01)

(58) Field of Classification Search
  USPC ........................................................ 345/173
  See application file for complete search history.

(56) References Cited

U.S. PATENT DOCUMENTS

| | | | | |
|---|---|---|---|---|
| 2009/0315854 A1* | 12/2009 | Matsuo | ................. | G06F 3/0443 345/174 |
| 2011/0227858 A1* | 9/2011 | An | ........................ | G06F 3/0446 345/174 |
| 2013/0082944 A1* | 4/2013 | Juan | ...................... | G06F 3/0412 345/173 |
| 2014/0049704 A1* | 2/2014 | Yao | ..................... | G02F 1/13338 349/12 |

(Continued)

FOREIGN PATENT DOCUMENTS

CN    204613923 U    9/2015

*Primary Examiner* — Chineyere D Wills-Burns
(74) *Attorney, Agent, or Firm* — Tarolli, Sundheim, Covell & Tummino LLP

(57) ABSTRACT

A touch display panel including first electrodes extending in a first direction and arranged in a second direction, and second electrodes extending in a second direction and arranged in the first direction; each first electrode includes first electrode blocks and first connecting electrodes arranged at intervals in the first direction; in the first electrode, two adjacent first electrode blocks are electrically connected by a first connecting electrode; each second electrode includes second electrode blocks and bridge structures arranged at intervals in the second direction; in each second electrode, two adjacent second electrode blocks are electrically connected by a bridge structure; the second electrode blocks are arranged in a different layer from the bridge structures; the bridge structures intersect the first connecting electrodes, and the dummy electrode is located between each second electrode block and the first connecting electrode adjacent thereto and intersects with the bridge structures.

17 Claims, 6 Drawing Sheets

(56) References Cited

U.S. PATENT DOCUMENTS

| | | | |
|---|---|---|---|
| 2015/0015532 A1* | 1/2015 | Choung | G06F 3/0445 |
| | | | 345/174 |
| 2017/0139525 A1* | 5/2017 | Jo | G06F 3/046 |
| 2017/0153726 A1* | 6/2017 | Lee | G06F 3/0448 |
| 2017/0262108 A1* | 9/2017 | Lin | G02F 1/134309 |
| 2017/0344162 A1* | 11/2017 | Lee | G06F 3/0412 |
| 2019/0302942 A1* | 10/2019 | Kim | G06F 3/047 |
| 2020/0050323 A1* | 2/2020 | Kent | G06F 3/0446 |
| 2020/0089350 A1* | 3/2020 | Han | G06F 3/044 |

* cited by examiner

TOUCH DISPLAY PANEL AND TOUCH DISPLAY DEVICE

CROSS-REFERENCE TO RELATED APPLICATIONS

The present disclosure claims priority to Chinese Patent Application No. 201811542264.4, filed on Dec. 17, 2018, the content of which is incorporated herein by reference in its entirety.

TECHNICAL FIELD

The present disclosure relates to the field of display technologies, and in particular, to a touch display panel and a touch display device.

BACKGROUND

With the development of human-computer interaction technology, touch technology is increasingly used on various displays. In a mutual capacitance touch display panel, a touch electrode includes multiple touch driving electrodes and multiple touch sensing electrodes. When the mutual capacitance touch display panel is in operation, it is required to provide a touch driving signal to the multiple touch driving electrodes, that is, to charge the touch electrodes. Under the action of the touch driving signal, the touch sensing electrodes and the touch driving electrodes are coupled to form a mutual capacitance. When a finger touches the touch display panel, coupling capacitance is formed between the finger and the touch electrode, causing a change in the output signal of the touch sensing electrode, based on which a position of the touch point is determined. However, the existing touch display panel has a problem that charging time of the touch electrode is long, and thus the report rate of the touch display panel is low.

SUMMARY

In view of this, the present disclosure provides a touch display panel and a touch display device for shortening the charging time of the touch electrode of the touch display panel and improving the report rate of the touch display panel.

In an aspect, the present disclosure provides a touch display panel, including: a plurality of first electrodes extending in a first direction and arranged in a second direction, wherein each of the plurality of first electrodes comprises a plurality of first electrode blocks and a plurality of first connecting electrodes, the plurality of first electrode blocks and the plurality of first connecting electrodes are arranged at intervals along the first direction, and in each of the plurality of first electrodes, two adjacent first electrode blocks of the plurality of first electrode blocks are electrically connected by at least one of the plurality of first connecting electrodes; a plurality of second electrodes extending in the second direction and arranged along the first direction, wherein each of the plurality of second electrodes comprises a plurality of second electrode blocks and a plurality of bridge structures, the plurality of second electrode blocks and the plurality of bridge structures are arranged at intervals along the second direction, and in each of the plurality of second electrodes, two adjacent second electrode blocks of the plurality of second electrode blocks are electrically connected by at least one of the plurality of bridge structures; and wherein the plurality of second electrode blocks are arranged in a different layer from the plurality of bridge structures, and the plurality of bridge structures intersect the plurality of first connecting electrodes; and a dummy electrode, the dummy electrode being located between each second electrode block of the plurality of second electrode blocks and one of the plurality of first connecting electrodes adjacent to the second electrode block, and the dummy electrode intersecting the plurality of bridge structures.

In another aspect, the present disclosure provides a touch display device, including the touch display panel described above.

In the touch display panel and the touch display device provided by the embodiments of the present disclosure, by providing a dummy electrode between a second electrode block and a first connecting electrode adjacent thereto, that is, providing a dummy electrode at an intersection position of a first electrode and a second electrode correspondingly, the dummy electrode provided in a floating-connection manner separates the second electrode block from the first connecting electrode, so that the dummy electrode functions to shield the second electrode block and the first connecting electrode, thereby weakening the mutual interference between the second electrode block and the first connecting electrode, reducing the coupling capacitance between the second electrode block and the first connecting electrode, shortening the charging time of the first electrode or the second electrode and increasing the report rate of the touch display panel.

BRIEF DESCRIPTION OF DRAWINGS

In order to more clearly illustrate technical solutions of embodiments of the present disclosure, the accompanying drawings used in the embodiments are briefly described below. It is understood that the drawings described below are merely a part of the embodiments of the present disclosure. Based on these drawings, those skilled in the art can obtain other drawings without any creative effort.

DESCRIPTION OF EMBODIMENTS

For a better understanding of the technical solutions of the present disclosure, the embodiments of the present disclosure will be described in detail below with reference to the accompanying drawings.

It should be noted that the described embodiments are only a part of the embodiments of the present disclosure, but not all of the embodiments. All other embodiments obtained by those skilled in the art based on the embodiments of the present disclosure without creative efforts are within the protection scope of the present disclosure.

The terms used in the embodiments of the present disclosure are merely for the purpose of describing particular embodiments and not intended to limit the present disclosure. Unless otherwise noted in the context, the singular form expressions "a", "an", "the" and "said" used in the embodiments and appended claims of the present disclosure are also intended to represent a plural form.

It should be understood that the term "and/or" as used herein merely indicates an association relationship of the associated object, meaning that there may be three relationships, for example, A and/or B may indicate three cases: only A exists; both A and B exist; and only B exists. In addition, the character "/" as used herein generally indicates that the contextual associated objects are in an "or" relationship.

It should be understood that although the terms first, second, etc. may be used to describe the electrodes in the embodiments of the present disclosure, these electrodes should not be limited to these terms. These terms are only used to distinguish the electrodes from each other. For example, the first electrode may also be referred to as a second electrode, and similarly, the second electrode may also be referred to as a first electrode without departing from the scope of the embodiments of the present disclosure.

Figure 1:
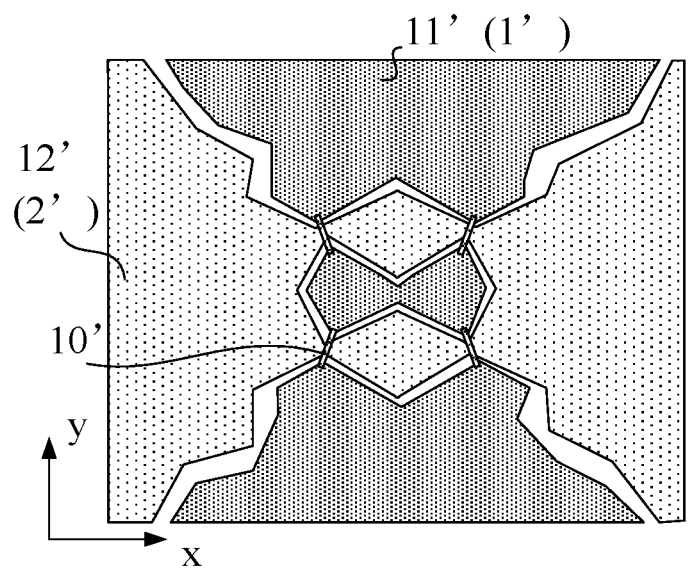
FIG. 1 illustrates a schematic diagram of a touch electrode in the related art.
Figure 2:
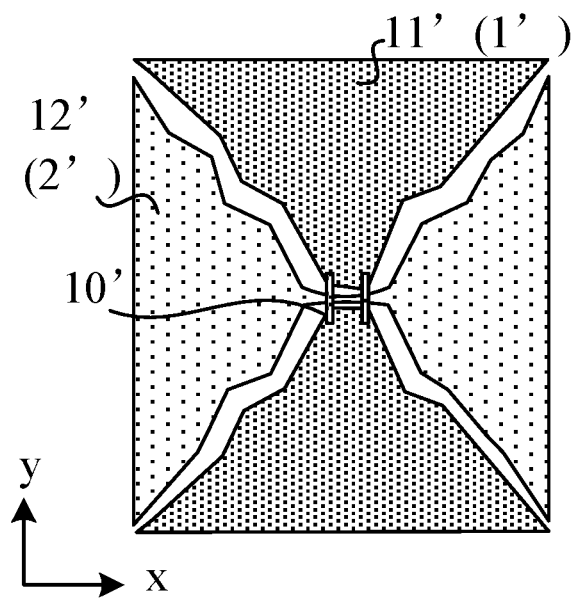
FIG. 2 illustrates a schematic diagram of another touch electrode in the related art.

As shown in FIG. 1 and FIG. 2, schematic diagrams of two touch electrodes having different patterns at intersection positions in the related art are respectively illustrated. The touch electrodes shown in FIG. 1 and FIG. 2 respectively include a touch driving electrode 1' and a touch sensing electrode 2'. The touch driving electrode 1' includes a plurality of touch driving electrode blocks 11', and the touch sensing electrode 2' includes a plurality of touch sensing electrode blocks 12'. Two adjacent touch driving electrode blocks 11' are electrically connected to each other through a bridge 10' which is located at a different film layer from the touch driving electrode 1'. With regarding to the problem of long charging time of the touch electrode in the related art, in the case where the areas of the repeating units of the touch electrode are the same, the inventor of the present disclosure performed a simulation test on the two kinds of touch electrodes respectively having the patterns shown in FIG. 1 and FIG. 2. The test indicates that the charging time of the touch electrode having the pattern shown in FIG. 1 is longer than that of the touch electrode having the pattern shown in FIG. 2, and the figures shown in FIGS. 1 and 2 respectively represent one repeating unit of the touch electrode, that is, the simulation test was performed under the condition that the figure areas of FIG. 1 and FIG. 2 are the same.

The inventor has found that at the intersection position of the touch electrodes, an area between the touch driving electrode blocks 11' and the touch sensing electrode blocks 12' of the touch electrode having the pattern shown in FIG. 1 is relatively large, while an area between the touch driving electrode blocks 11' and the touch sensing electrode blocks 12' of the touch electrode having the pattern shown in FIG. 2 is relatively small. As a result, the touch electrode having the pattern shown in FIG. 1 has a relatively large coupling capacitance at the intersection position, and the touch electrode having the pattern shown in FIG. 2 has a relatively small coupling capacitance at the intersection position, such that the charging time of the touch electrode having the pattern shown in FIG. 1 is longer than that of the touch electrode having the pattern shown in FIG. 2, causing the report rate of the touch panel formed by the touch electrode having the pattern shown in FIG. 1 to be lower than the report rate of the touch panel formed by the touch electrode having the pattern shown in FIG. 2.

Figure 3:
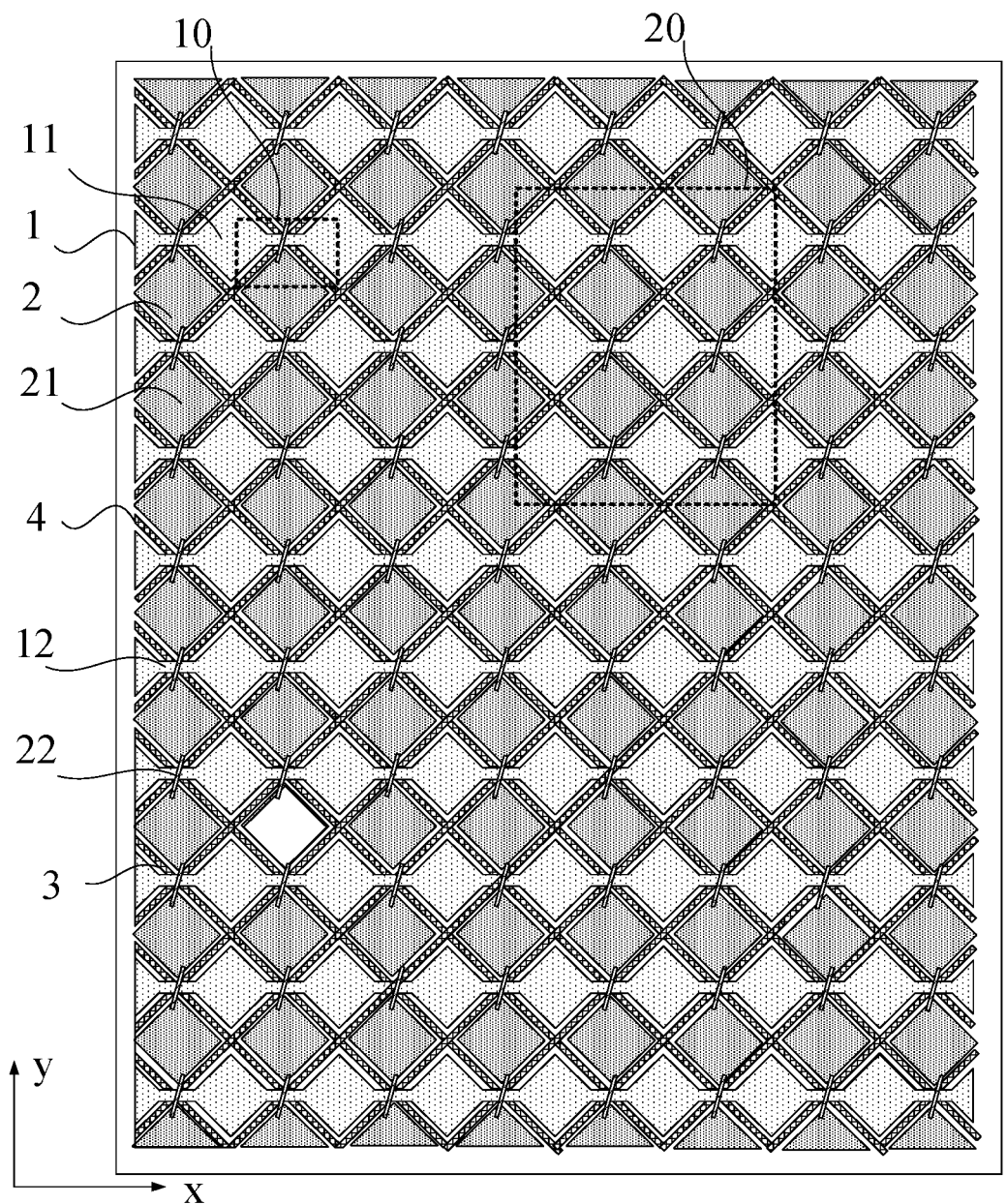
FIG. 3 illustrates a schematic diagram of a touch display panel according to an embodiment of the present disclosure.
Figure 4:
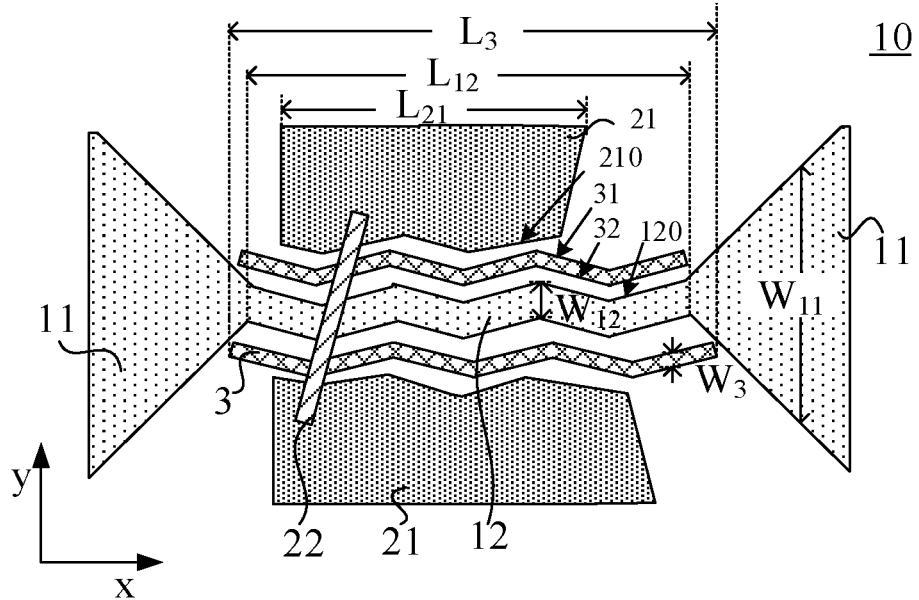
FIG. 4 illustrates an enlarged schematic diagram of a region 10 in FIG. 3.

Based on this, an embodiment of the present disclosure provides a touch display panel, as shown in FIG. 3 and FIG. 4. FIG. 3 illustrates a schematic diagram of a touch display panel according to an embodiment of the present disclosure, which simply indicates an arrangement of the touch electrodes on the touch display panel, and the details can be referred to an enlarged diagram of a partial region in FIG. 3. FIG. 4 illustrates an enlarged schematic diagram of a region 10 in FIG. 3. The touch display panel includes a plurality of first electrodes 1, a plurality of second electrodes 2 and a dummy electrode 3. The plurality of first electrodes 1 extends along a first direction x and is arranged along a second direction y; the plurality of second electrodes 2 extends along the second direction y and is arranged along the first direction x.

Each of the first electrodes 1 includes multiple first electrode blocks 11 and multiple first connecting electrodes 12, and the multiple first electrode blocks 11 and the multiple first connecting electrodes 12 are arranged at intervals in the first direction x; and in each of the first electrodes 1, two adjacent first electrode blocks 11 are electrically connected to each other by the first connecting electrode 12. Each of the second electrodes 2 includes multiple second electrode blocks 21 and multiple bridge structures 22, and the multiple second electrode blocks 21 and the multiple bridge structures 22 are arranged at intervals in the second direction y; in each of the second electrodes 2, two adjacent second electrode blocks 21 are electrically connected to each other by the bridge structure 22; and the second electrode blocks 21 are arranged in a different layer from the bridge structures 22.

As shown in FIG. 4, the bridge structure 22 intersects the first connecting electrode 12; the dummy electrode 3 is located between the second electrode block 21 and the first connecting electrode 12 adjacent thereto, and the dummy electrode 3 intersects the bridge structure 22.

Illustratively, when the touch display panel is in operation, the first electrode 1 can be used as a touch sensing electrode, and the second electrode 2 can be used as a touch driving electrode; or, the first electrode 1 is used as the touch driving electrode, and the second electrode 2 is used as the touch sensing electrode, which is not limited in the embodiment of the present disclosure. In an example that the first electrode 1 is a touch sensing electrode and the second electrode 2 is a touch driving electrode, when the touch display panel is in operation, the plurality of first electrodes 1 is provided one by one with a touch driving signal. When the touch display panel is touched with a finger, a touch sensing signal output by the second electrode 2 changes, so that the position of the touching point is determined. The dummy electrode 3 is floating-connected, that is, the dummy electrode 3 do not load any electrical signal.

In the embodiment of the present disclosure, by providing the dummy electrode 3 between the second electrode block 21 and the first connecting electrode 12 adjacent thereto, that is, providing the dummy electrode 3 at an intersection position of the first electrode 1 and the second electrode 2 correspondingly, the dummy electrode 3 provided in a floating-connection manner separates the second electrode block 21 from the first connecting electrode 12, so that the dummy electrode 3 functions to shield the second electrode block 21 from the first connecting electrode 12, thereby weakening the mutual interference between the second electrode block 21 and the first connecting electrode 12, reducing the coupling capacitance between the second electrode block 21 and the first connecting electrode 12, shortening the charging time of the first electrode 1 or the second electrode 2 and increasing the report rate of the touch display panel.

Illustratively, a dummy electrode 3 is provided between each of the second electrode blocks 21 and the first connecting electrode 12 adjacent thereto in the touch display panel, improving the touch effect of the entire touch display panel.

Illustratively, as shown in FIG. 4, the shape of the first connecting electrode 12 is a zigzag shape or a wave shape. In the embodiment of the present disclosure, the shape of the first connecting electrode 12 is designed to be an irregular shape such as a zigzag shape or a wave shape, and in this way, when the external light is incident on the first connecting electrode 12, the reflection angles of the light at different positions thereof are different due to its irregular shape, thereby weakening the edge visibility of the first connecting electrode 12 and improving the display effect of the touch display panel.

Correspondingly, the shape of the dummy electrode 3 is a zigzag shape or wave shape. As shown in FIG. 4, the dummy electrode 3 includes a first edge 31 and a second edge 32; the first edge 31 is close to the second electrode block 21, and the second edge 32 is close to the first connecting electrode 12. The first edge 31 and the second edge 32 described above have a zigzag shape or a wave shape. In the embodiment of the present disclosure, the shape of the first edge 31 and the second edge 32 of the dummy electrode 3 is designed to be an irregular shape such as a zigzag shape or a wave shape, and in this way, when the external light is incident on the first edge 31 and the second edge 32 of the dummy electrode 3, the reflection angles of the light at different positions thereof are different, such that the visibility of the first edge 31 and the second edge 32 can be weakened, that is, the visibility of the dummy electrode 3 is weakened, which improves the display effect of the touch display panel.

In addition, compared with the case where the edges of the dummy electrode 3 are shaped as straight lines, by configuring the shape of the dummy electrode 3 to be a zigzag shape or a wave shape in the embodiment of the present disclosure, the length of the dummy electrode 3 can be increased in the case where the distance between two adjacent first electrode blocks 11 is constant, thereby better shielding the second electrode block 21 and the first connecting electrode 12 and further weakening the mutual interference between the second electrode block 21 and the first connecting electrode 12.

It should be understood that the present disclosure is exemplarily described in FIG. 4 only by taking the first edge 31 and the second edge 32 having a same shape as an example. In practice, the shapes of the first edge 31 and the second edge 32 may be different. For example, the first edge 31 may be designed to be in a zigzag shape and the second edge 32 may be designed to be in a wave shape, which is not limited in the embodiments of the present disclosure. Moreover, the first connecting electrode 12 and the dummy electrode 3 may be in a zigzag shape or a wave shape which repeatedly extends. For example, when the first connecting electrode 12 is configured to be in a zigzag shape, the widths of the first connecting electrode 12 at different positions can be configured to be equal and the shape and size of the zigzag at different positions are configured to be the same, so that the first connecting electrode 12 is repeatedly arranged with the same minimum repeating units. Of course, the first connecting electrode 12 and the dummy electrode 3 may also be in a zigzag or wave shape which is non-repetitively extending. For example, when the first connecting electrode 12 is configured to be in a wave shape, the widths of the first connecting electrode 12 at different positions may be configured to be not equal, or, the shapes and sizes of the wave at different positions are configured to be different. Alternatively, the first connecting electrode 12 and the dummy electrode 3 may be configured to be in a mixed shape of the zigzag shape and the wave shape, besides, other non-linear shapes may be used. Of course, in order to simplify the preparation process, the first connecting electrode 12 and the dummy electrode 3 may be configured to be in a straight line shape without particularly affecting the display effect.

Illustratively, as shown in FIG. 4, in the second direction y, a width $W_{12}$ at any position of the first connecting electrode 12 is smaller than a width $W_{11}$ at any position of the first electrode block 11. By configuring the width $W_{12}$ of the first connecting electrode 12 to be smaller than the width $W_{11}$ of the first electrode block 11 in the second direction y in the embodiment of the present disclosure, that is, by configuring the distance between the two adjacent second electrode blocks 21 to be relatively short, the length of the bridge structure 22 can be prevented from being excessively long, which can lower the visibility of the bridge structure 22.

Illustratively, as shown in FIG. 4, the number of the first connecting electrode 12 between two adjacent first electrode blocks 11 is one. Compared with the structure shown in FIG. 1, by configuring the number of the first connecting electrode 12 between two adjacent first electrode blocks 11 to be one in the embodiment of the present disclosure, the area between the first connecting electrode 12 and the second electrode block 21 adjacent to the connection electrode 12 can be reduced in the case where the length of the first connecting electrode 12 is constant, thereby weakening the mutual interference between the second electrode block 21 and the first connecting electrode 12.

Optionally, with continued reference to FIG. 4, in the first direction x, the length $L_3$ of the dummy electrode 3 is greater than or equal to the length $L_{12}$ of the first connecting electrode 12, and/or, in the first direction x, the length $L_3$ of the dummy electrode 3 is greater than or equal to the length $L_{21}$ of the second electrode block 21. By making the length $L_3$ of the dummy electrode 3 larger than the length of at least one of the first connecting electrode 12 and the second electrode block 21 in the embodiment of the present disclosure, the dummy electrode 3 separates the first connecting electrode 12 from the second electrode block 21 in the first direction x to the maximum extent, to further reduce the mutual interference between the first connecting electrode 11 and the second electrode block 21.

Illustratively, as shown in FIG. 4, an edge 210 of the second electrode block 21 is opposite to an edge 120 of the first connecting electrode 12, moreover, the edge 210 of the second electrode block 21 and the edge 120 of the first connecting electrode 12 opposite thereto have the same shape; the shape of the first edge 31 of the dummy electrode 3 is the same as the shape of the edge 210 of the second electrode block 21; the shape of the second edge 32 is the same as the shape of the edge 120 of the first connecting electrode 12 adjacent thereto. In the embodiment of the present disclosure, the edges, which are opposite to one another, of the second electrode block 21, the dummy electrode 3 and the first connecting electrode 12 are designed in the above manner, such that the dummy electrode 3 can better separate the second electrode block 21 from the first connecting electrode 12. Moreover, the arrangement of the second electrode block 21, the dummy electrode 3 and the first connecting electrode 12 in the touch display panel can be made to be more compact, which improves the space utilization ratio in the touch display panel.

Illustratively, as shown in FIG. 4, in the second direction y, the distance $W_3$ between the first edge 31 and the second edge 32 is greater than or equal to 5 microns, and within this range, the dummy electrode 3 can function as a good isolation for the first connecting electrode 12 and the second electrode block 21. Optionally, a maximum distance between the first edge 31 and the second edge 32 of the dummy electrode 3 can be adjusted according to the actual sizes of different products, which is not limited by the embodiments of the present disclosure.

Figure 5:
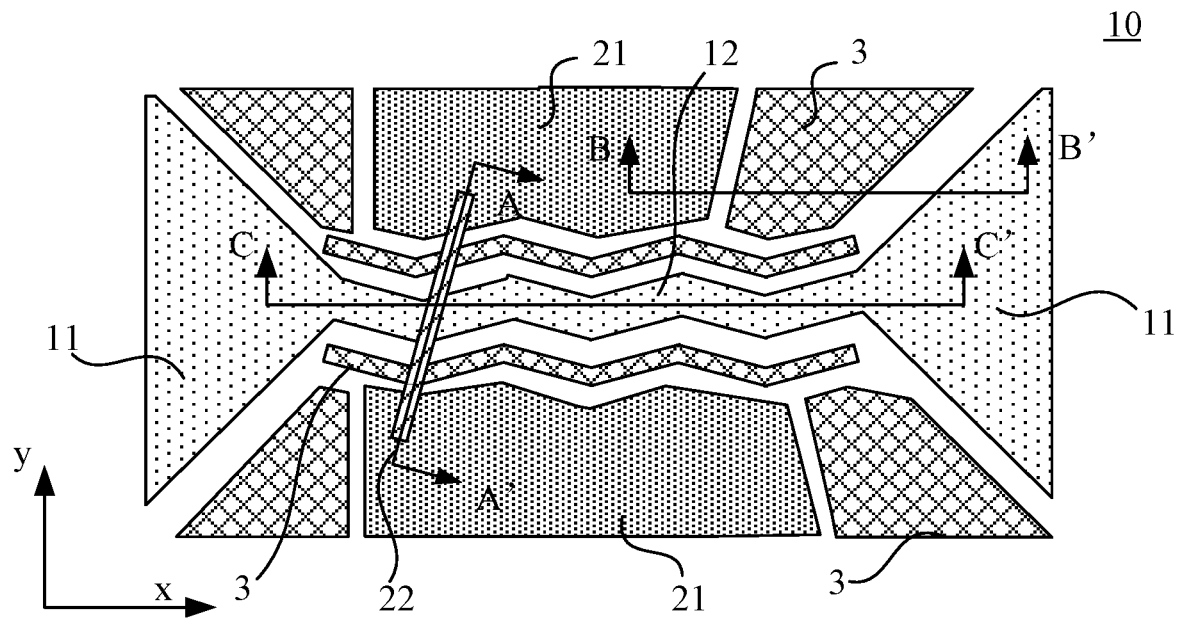
FIG. 5 illustrates another enlarged schematic diagram of the region 10 in FIG. 3.

Illustratively, as shown in FIG. 3 and FIG. 5, FIG. 5 illustrates another enlarged schematic diagram of the area 10 in FIG. 3. Between the second electrode block 21 and the first electrode block 11 adjacent thereto, a dummy electrode 3 is also provided so as to reduce touch signal interference between the adjacent first electrode block 11 and second electrode block 21 and lower the visibility at the gap between the second electrode block 22 and the first electrode block 11 adjacent thereto. Illustratively, gaps are formed between the dummy electrode 3 and the second electrode block 21 and between the dummy electrode 3 and the first electrode block 11.

It should be noted that when configuring the dummy electrode 3 actually, as shown in FIG. 5, the dummy electrode 3 located between the second electrode block 21 and the first electrode block 11 adjacent thereto can be configured to be not connected to the dummy electrode 3 located between the second electrode block 21 and the first connecting electrode 12 adjacent thereto, alternatively, the dummy electrode 3 located between the second electrode block 21 and the first electrode block 11 adjacent thereto can be configured to be connected to the dummy electrode 3 located between the second electrode block 21 and the first connecting electrode 12 adjacent thereto, which is not limited in the embodiment of the present disclosure.

Figure 6:
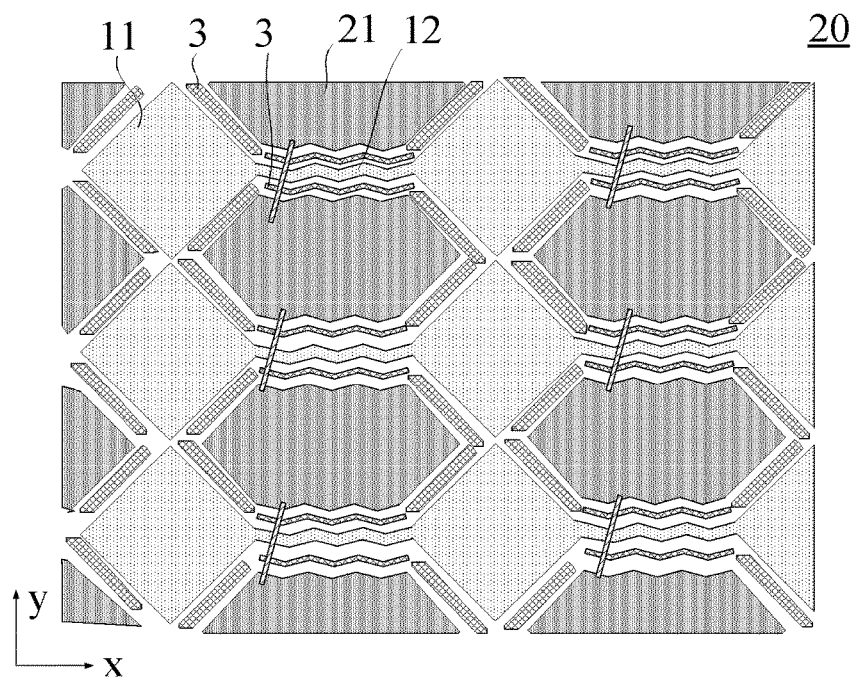
FIG. 6 illustrates an enlarged schematic diagram of a region 20 in FIG. 3.

Optionally, as shown in FIG. 6, FIG. 6 illustrates an enlarged schematic diagram of the area 20 in FIG. 3, wherein a dummy electrode 3 is provided between each of the second electrode blocks 21 and the first electrode block 11 adjacent thereto in the touch display panel in order to reduce the touch signal interference between each of the first electrode blocks 11 and the second electrode block 21 adjacent thereto, improve the touch effect of the entire touch display panel and lower the visibility at the gap between each of the first electrode blocks 11 and the second electrode block 21 adjacent thereto.

Illustratively, as shown in FIG. 6, in the embodiment of the present disclosure, the dummy electrodes 3 located between different second electrode blocks 21 and different first electrode blocks 11 can be configured as multiple segment structures which are not connected to each other, or the dummy electrodes 3 located between different second electrode blocks 21 and different first electrode blocks 11 can be configured to be connected to one another so as to simplify the fabrication process of the dummy electrodes 3. Optionally, the shapes of the edges of the dummy electrode 3 located between the second electrode block 21 and the first electrode block 11 may be correspondingly configured according to the shapes of the edges of the corresponding second electrode block 21 and first electrode block 11, which is not limited in the embodiment of the present disclosure. For example, the shapes of the edges of the dummy electrode 3 may be respectively configured to be the same as the shape of the edge of the second electrode block 21 adjacent thereto and the shape of the edge of the first electrode block 11 adjacent thereto.

Figure 7:
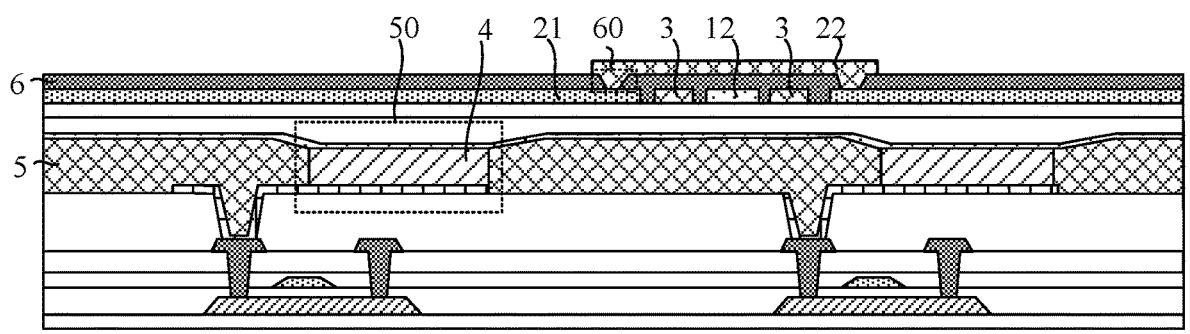
FIG. 7 illustrates a schematic cross-sectional diagram taken along AA' in FIG. 5.

Optionally, as shown in FIG. 7, FIG. 7 illustrates a cross-sectional diagram taken along AA' in FIG. 5, wherein the above touch display panel further includes a plurality of sub-pixels 4; the dummy electrode 3 does not intersect the sub-pixels 4 so as to prevent the dummy electrode 3 from affecting the normal light output of the sub-pixels 4. The touch display panel further includes a pixel definition layer 5 and an insulating layer 6, and the pixel definition layer 5 includes a plurality of aperture regions 50. The aperture regions 50 are in one-to-one correspondence with the sub-pixels 4, and each of the sub-pixels 4 is located in the corresponding aperture region 50; and the dummy electrode 3 does not intersect the aperture region 50. The insulating layer 6 is located between the bridge structure 22 and the second electrode block 21, and moreover, the bridge structure 22 is electrically connected to the second electrode block 21 through a via hole 60 opened in the insulating layer 6.

Figure 8:
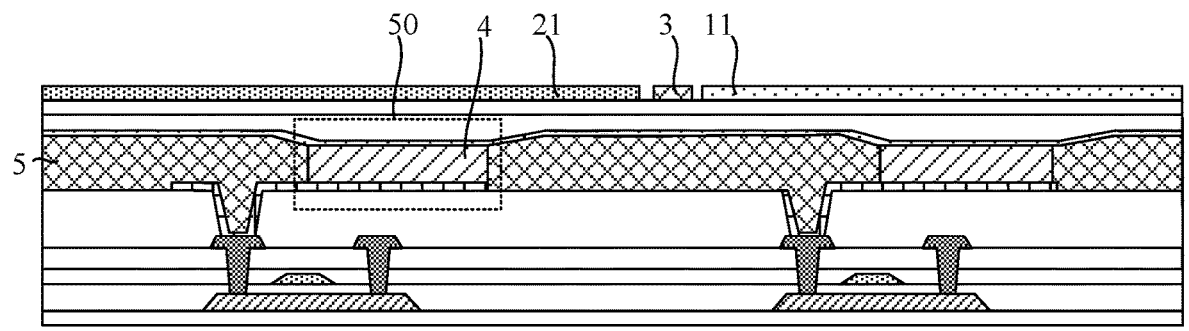
FIG. 8 illustrates a schematic cross-sectional diagram taken along BB' in FIG. 5.

Optionally, as shown in FIG. 8, FIG. 8 illustrates a schematic cross-sectional diagram taken along line BB' in FIG. 5, wherein the dummy electrode 3 is provided in the same layer as the first electrode block 11 and the second electrode block 21, and in addition, the material of the dummy electrode 3 is the same as that of the first electrode block 11 and the second electrode block 21.

Figure 9:
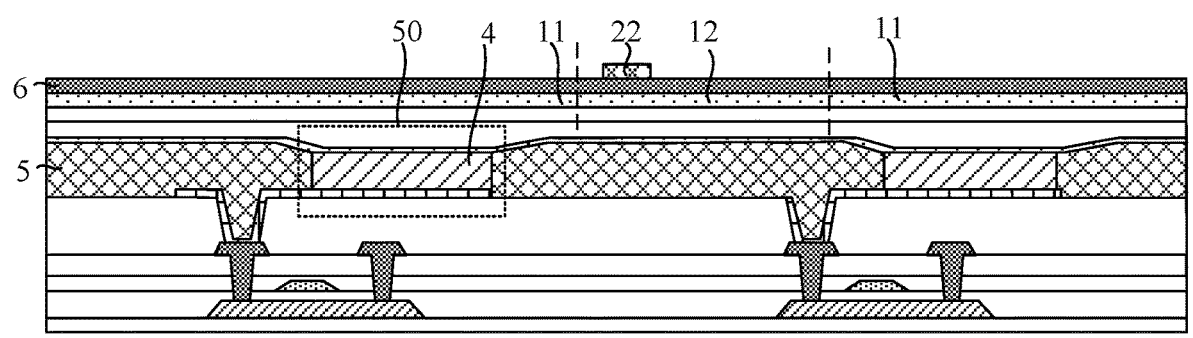
FIG. 9 illustrates a schematic cross-sectional diagram taken along CC' in FIG. 5.

Illustratively, as shown in FIG. 9, FIG. 9 illustrates a schematic cross-sectional diagram taken along CC' in FIG. 5, wherein the first electrode block 11 and the first connecting electrode 12 are arranged in the same layer, the first connecting electrode 12 intersects the bridge structure 22, and moreover, the insulating layer 6 is further included between the first connecting electrode 12 and the bridge structure 22, while the material of the first electrode block 11 is the same as that of the first connecting electrode 12.

Optionally, the second electrode block 21, the dummy electrode 3, the first electrode block 11 and the first connecting electrode 11 may be made of a material including any one of the transparent metal oxide materials such as indium tin oxide, indium zinc oxide, indium gallium zinc oxide and so on. The material of the bridge structure 22 includes a metal material to reduce the electrical resistance of the second electrode 2 and improve the sensitivity of the touch display panel.

Figure 10:
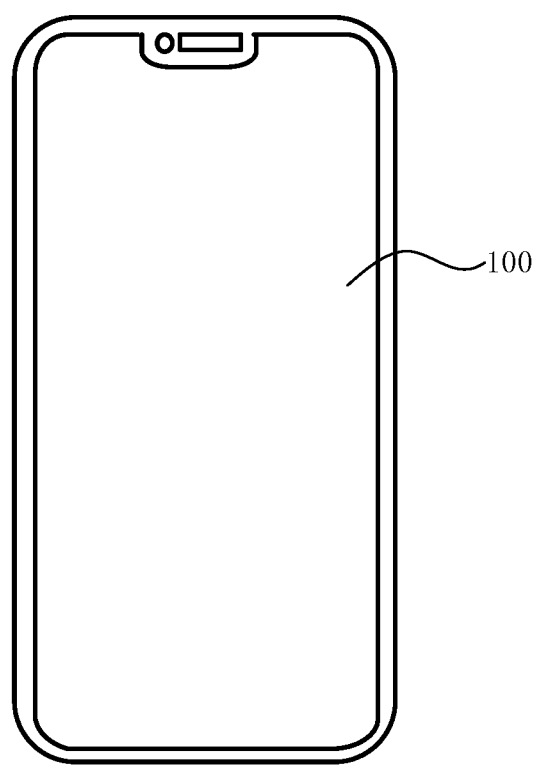
FIG. 10 illustrates a schematic diagram of a touch display device according to an embodiment of the present disclosure.

The present disclosure further provides a touch display device. As shown in FIG. 10, FIG. 10 illustrates a schematic diagram of a touch display device according to an embodiment of the present disclosure, wherein the touch display device includes the touch display panel 100 described above. The specific structure of the touch display panel 100 has been described in detail in the above embodiments, which is not described herein again. Of course, the display device shown in FIG. 10 is merely illustrative, and the display device may be any electronic device having a display function such as a mobile phone, a tablet computer, a notebook computer, an electronic paper book, a television and so on.

In the touch display device provided by the embodiment of the present disclosure, by providing a dummy electrode between a second electrode block and a first connecting electrode adjacent thereto, that is, providing a dummy electrode at an intersection position of a first electrode and a second electrode correspondingly, the dummy electrode provided in a floating-connection manner separates the second electrode block from the first connecting electrode, so that the dummy electrode functions to shield the second electrode block and the first connecting electrode, thereby weakening the mutual interference between the second electrode block and the first connecting electrode, reducing the coupling capacitance between the second electrode block and the first connecting electrode, shortening the charging time of the first electrode or the second electrode and increasing the report rate of the touch display device.

The description above is only some embodiments of the present disclosure and is not intended to limit the present disclosure. Any modifications, equivalent substitutions, improvements, etc., which are included in the concepts and principles of the present disclosure, should be included in the protection scope of the present disclosure.

What is claimed is:

1. A touch display panel, comprising:
   a plurality of first electrodes extending in a first direction and arranged in a second direction, wherein each of the plurality of first electrodes comprises a plurality of first electrode blocks and a plurality of first connecting electrodes, the plurality of first electrode blocks and the plurality of first connecting electrodes are arranged at intervals along the first direction, and in each of the plurality of first electrodes, two adjacent first electrode blocks of the plurality of first electrode blocks are electrically connected by at least one of the plurality of first connecting electrodes;
   a plurality of second electrodes extending in the second direction and arranged along the first direction, wherein each of the plurality of second electrodes comprises a plurality of second electrode blocks and a plurality of bridge structures, the plurality of second electrode blocks and the plurality of bridge structures are arranged at intervals along the second direction, and in each of the plurality of second electrodes, two adjacent second electrode blocks of the plurality of second electrode blocks are electrically connected by at least one of the plurality of bridge structures; and wherein the plurality of second electrode blocks are arranged in a different layer from the plurality of bridge structures, and the plurality of bridge structures intersect the plurality of first connecting electrodes; and
   a dummy electrode, the dummy electrode being located between each second electrode block of the plurality of second electrode blocks and one of the plurality of first connecting electrodes adjacent to the second electrode block, the dummy electrode intersecting the plurality of bridge structures, the dummy electrode having a shape comprising a plurality of repeated zigzags or a plurality of repeated waves, and the dummy electrode extending only in the first direction.

2. The touch display panel according to claim 1, wherein each of the plurality of first connecting electrodes is in a zigzag shape or a wave shape.

3. The touch display panel according to claim 2, wherein each of the plurality of first connecting electrodes has a width smaller than a width of one of the plurality of first electrode blocks in the second direction.

4. The touch display panel according to claim 3, wherein two adjacent first electrode blocks of the plurality of first electrode blocks are electrically connected by one of the plurality of first connecting electrodes.

5. The touch display panel according to claim 4, wherein the dummy electrode has a length greater than or equal to a length of each of the plurality of first connecting electrodes in the first direction, and/or
   the dummy electrode has a length greater than or equal to a length of each of the plurality of second electrode blocks in the first direction.

6. The touch display panel according to claim 5, wherein the dummy electrode comprises a first edge and a second edge, the first edge is close to one second electrode block, adjacent to the dummy electrode, of the plurality of second electrode blocks and the second edge is close to one first connecting electrode, adjacent to the dummy electrode, of the plurality of first connecting electrodes; and
   a shape of the first edge is the same as a shape of an edge, opposite to the first edge, of the one second electrode block; and a shape of the second edge is the same as a shape of an edge, opposite to the second edge, of the one first connecting electrode.

7. The touch display panel according to claim 6, wherein the first edge has a zigzag shape or a wave shape, and the second edge has a zigzag shape or a wave shape.

8. The touch display panel according to claim 6, wherein a distance between the first edge and the second edge in the second direction is greater than or equal to 5 microns.

9. The touch display panel according to claim 1, wherein the dummy electrode is further located between each second electrode block of the plurality of second electrode blocks and one first electrode block of the plurality of first electrode blocks adjacent to the second electrode block.

10. The touch display panel according to claim 1, further comprising a plurality of sub-pixels, wherein the dummy electrode does not intersect the plurality of sub-pixels.

11. The touch display panel according to claim 10, further comprising a pixel definition layer, wherein the pixel definition layer comprises a plurality of aperture regions, the plurality of aperture regions is in one-to-one correspondence with the plurality of sub-pixels, each of the plurality of sub-pixels is located in one of the plurality of aperture regions, and the dummy electrode does not intersect the plurality of aperture regions.

12. The touch display panel according to claim 1, wherein the dummy electrode is arranged in a same layer as the plurality of first electrode blocks and the plurality of second electrode blocks, and the dummy electrode is made of a same material as the plurality of first electrode blocks and the plurality of second electrode blocks.

13. The touch display panel according to claim 1, wherein the plurality of first electrode blocks and the plurality of first connecting electrodes are arranged in a same layer, and the plurality of first electrode blocks are made of a same material as the plurality of first connecting electrodes.

14. The touch display panel according to claim 13, wherein the material of the plurality of first electrode blocks and the plurality of first connecting electrodes comprises indium tin oxide, indium zinc oxide or indium gallium zinc oxide.

15. The touch display panel according to claim 1, wherein a material of the plurality of bridge structures comprises a metal material.

16. The touch display panel according to claim 1, wherein the plurality of first electrodes are touch sensing electrodes and the plurality of second electrodes are touch driving electrodes; or the plurality of first electrodes are touch driving electrodes and the plurality of second electrodes are touch sensing electrodes.

17. A touch display device, comprising a touch display panel, wherein the touch display panel comprises:
- a plurality of first electrodes extending in a first direction and arranged in a second direction, wherein each of the plurality of first electrodes comprises a plurality of first electrode blocks and a plurality of first connecting electrodes, the plurality of first electrode blocks and the plurality of first connecting electrodes are arranged at intervals along the first direction, and in each of the plurality of first electrodes, two adjacent first electrode blocks of the plurality of first electrode blocks are electrically connected by at least one of the plurality of first connecting electrodes;
- a plurality of second electrodes extending in the second direction and arranged along the first direction, wherein each of the plurality of second electrodes comprises a plurality of second electrode blocks and a plurality of bridge structures, the plurality of second electrode blocks and the plurality of bridge structures are arranged at intervals along the second direction, and in each of the plurality of second electrodes, two adjacent second electrode blocks of the plurality of second electrode blocks are electrically connected by at least one of the plurality of bridge structures; and wherein the plurality of second electrode blocks are arranged in a different layer from the plurality of bridge structures, and the plurality of bridge structures intersect the plurality of first connecting electrodes; and
- a dummy electrode, the dummy electrode being located between each second electrode block of the plurality of second electrode blocks and one of the plurality of first connecting electrodes adjacent to the second electrode block, the dummy electrode intersecting the plurality of bridge structures, the dummy electrode having a shape comprising a plurality of repeated zigzags or a plurality of repeated waves, and the dummy electrode extending only in the first direction.

* * * * *